United States Patent [19]
Hahl

[11] Patent Number: 6,098,922
[45] Date of Patent: *Aug. 8, 2000

[54] LIFTING-FUSELAGE/WING AIRCRAFT HAVING LOW INDUCED DRAG

[75] Inventor: Robert W. Hahl, Falls Church, Va.

[73] Assignee: Redwood Aircraft Corporation, Falls Church, Va.

[*] Notice: This patent is subject to a terminal disclaimer.

[21] Appl. No.: 09/157,377

[22] Filed: Sep. 21, 1998

Related U.S. Application Data

[62] Division of application No. 08/642,998, May 13, 1996, Pat. No. 5,813,628.

[51] Int. Cl.$^7$ .................. B64C 1/00; B64C 3/54
[52] U.S. Cl. .................. 244/36; 244/48; 244/218
[58] Field of Search .................. 244/36, 48, 218, 244/212, 119, 120, 124

[56] References Cited

U.S. PATENT DOCUMENTS

| | | | |
|---|---|---|---|
| D. 198,610 | 7/1964 | Burnelli | 244/36 |
| 1,780,813 | 11/1930 | Burnelli | 244/36 |
| 1,893,129 | 1/1933 | Charpentier | 244/36 |
| 2,294,367 | 9/1942 | Fleming | 344/36 |
| 2,380,289 | 7/1945 | Burnelli | 244/36 |
| 2,380,290 | 7/1945 | Burnelli | 244/36 |
| 2,402,283 | 6/1946 | Hewitt | 244/36 |
| 2,496,087 | 1/1950 | Fleming | 244/36 |
| 2,616,639 | 11/1952 | Burnelli | 244/36 |
| 2,734,701 | 2/1956 | Horton | 244/36 |
| 2,941,752 | 6/1960 | Gluhareff | 244/36 |
| 3,104,079 | 9/1963 | Phillips | 244/36 |
| 3,216,673 | 11/1965 | Alter et al. | 244/12 |
| 3,389,879 | 6/1968 | Brebe | 244/17.11 |
| 3,576,300 | 4/1971 | Palfreyman | 244/36 |
| 3,608,850 | 9/1971 | Fredericks | 244/36 |
| 3,630,471 | 12/1971 | Fredericks | 244/36 |
| 3,869,102 | 3/1975 | Carroll | 244/36 |
| 3,955,780 | 5/1976 | Postelson | 244/12.13 |
| 4,146,199 | 3/1979 | Wenzel | 244/45 R |
| 4,986,493 | 1/1991 | Sarh | 244/46 |
| 5,769,358 | 6/1998 | Hahl et al. | 244/36 |
| 5,813,628 | 9/1998 | Hahl | 244/36 |

OTHER PUBLICATIONS

Jane's Encyclopedia of Aviation, Compiled and edited by Michael J. H. Taylor, Cresent Books, p. 394. 1993 Edition.
Garrison, Peter; *Flying*, "Technicalities, Blasts From The Past", Apr. 1994, pp. 102–104.
Sweetman, Bill et al.; *Popular Science*, "Megaplanes", Apr. 1995, pp. 54–57 and 93.
Rans Aircraft, "Rans S–11 Pursuit Specifications & Performance", Jan. 1994.
Jane's All the World's Aircraft, Edited by Mark Lambert, Jane's Information Group Ltd., United Kingdom, 1993–1994, p. 694.
Aviation Week & Space Technology, "Officials to Reassess ILA's 'East–West Bridge' Role", Jun. 6, 1994; vol. 140, No. 23, p. 28.
Flight International, Russia: Aviaexport Feature—Tupolev Launches Cargo Design, Jun. 2, 1993, p. 13.
Sport Aviation, "The Carter Copter," Jay Carter, Jr., Mar. 14, 1996, p. 13.
Ed Cantilli: "Saga of the Lifting Body/Flying Wing;" Flight; pp. 56–61.
International Search Report Dated Jul. 24, 1997.

*Primary Examiner*—J. Woodrow Eldred
*Attorney, Agent, or Firm*—Oblon, Spivak, McClelland, Maier & Neustadt, P.C.

[57] ABSTRACT

A lifting-fuselage/wing aircraft having low drag at a selected cruise condition. The aircraft includes (a) a lifting fuselage having a cross-section constituting an airfoil in a majority of vertical planes taken parallel to the flight direction and an aspect ratio ($AR_f$) of 0.33 to 1.10; (b) wings fixed to the fuselage having an aspect ratio ($AR_w$) of at least 5.0; (c) a mechanism controlling aircraft attitude; and (d) a mechanism propelling the aircraft; wherein the wings and fuselage produce lift in varying proportions depending upon flight conditions as follows: (i) the aircraft has a cruise design point in which the fuselage lift coefficient ($C_{LF}$) is 0.08 or less, and (ii) the fuselage lift coefficient is at least 0.50 at an angle of attack ($\alpha_{LZo}$) of 10°, in level flight at sea level (ISA) with all movable lift enhancing devices retracted.

28 Claims, 3 Drawing Sheets

с,098,922

LIFTING-FUSELAGE/WING AIRCRAFT HAVING LOW INDUCED DRAG

This application is a division of Ser. No. 08/642,998 filed May 13, 1996 now U.S. Pat. No. 5,813,628.

BACKGROUND OF THE INVENTION

1. Field of the Invention

An aircraft having high aspect ratio wings and a lifting-body fuselage.

2. Discussion of the Background

Airplanes which have wings of high aspect ratio (AR) typically have tubular fuselages of circular or oval cross section that provide negligible portions of the lift. Many proposals have been made to enhance the airplane's ability to generate lift by giving the fuselage an airfoil shape. Taking this idea to its extreme results in the Northrop "flying wing" designs which have no fuselage or tail in the conventional sense. Flying wings have a serious limitation in that they are relatively short in length, so pitch control surfaces at the rear do not have enough leverage to handle normal shifts in the location of the center of gravity. In general, the CG range of a pure flying wing is so limited that its mission must be highly specialized.

A number of designs have been proposed which combine a distinct lifting-fuselage with a distinct high aspect ratio wing. This type generally has a pitch control surface located far enough behind the aircraft's center of gravity that it has a large CG range. A series of such lifting-fuselage/wing airplanes were designed and built in the United States by Vincent Burnelli in the 1920's and 1930's and described in U.S. Pat. Nos. 1,780,813; 2,380,289; 2,380,290; 2,616,639 and D 198,610. In 1936 the Burnelli UB14B transport aircraft was produced with a high aspect ratio wing and an airfoil-shaped fuselage holding the flight crew and fourteen passengers. Other patents describing lifting-fuselage/wing aircraft include U.S. Pat. No. 3,869,102 (Carroll); U.S. Pat. No. 3,216,673 (Alter et al); U.S. Pat. No. 2,734,701 (Horton); U.S. Pat. No. 3,630,471 (Fredricks) and U.S. Pat. No. 4,146,199 (Wenzell). Few such aircraft have been built and none has been very successful.

A widely cited reason for the failure of early lifting-fuselage/wing airplanes is that the configuration necessarily has more drag than conventional airplanes. That is because a lifting fuselage constitutes a wing of low aspect ratio, and it is well known that the lift to drag ratio (L/D) of a wing decreases as its aspect ratio decreases. This effect is due mainly to an increase in the induced drag (drag due to lift) which occurs as the span is reduced. Therefore, any additional lift produced by a fuselage would add more induced drag than simply enlarging the wing would do. Because of this fundamental problem, there has not been much recent interest in lifting-fuselage/wing designs. An article in the April 1994 edition of *Flying* magazine stated > The lifting fuselage is one of those popular misconceptions that never die. When an airplane has a long skinny wing going one way and a long skinny fuselage going the other, lift from the fuselage is no virtue, because it can only be produced at a very high price in induced drag, and besides it can only be destabilizing. It's no accident that all modern airliners have fuselages consisting of a cylindrical central section with a streamlined nose and tail. If there were something to be gained by giving the fuselage the profile of an airfoil, Boeing et al would have done so.

This argument is valid when the fuselage is narrow. However, if the body is made extremely wide there is something to be gained by giving it the profile of an airfoil. Such a body can produce large amounts of lift at high angles of attack; enough lift to replace one or more of the usual high-lift devices, e.g., wing flaps, yet retain the ability to fly at slow speeds. But that benefit alone would not outweigh the penalties if the fuselage added too much induced drag at cruise speeds. The present invention solves that problem.

SUMMARY OF THE INVENTION

One object of this invention is to provide an aircraft comprising:

(a) a lifting fuselage having a cross-section constituting an airfoil in a majority of vertical planes taken parallel to the flight direction and an aspect ratio ($AR_f$) of 0.33 to 1.10;

(b) wings fixed to the fuselage having an aspect ratio ($AR_w$) of 5.0 or greater;

(c) a mechanism controlling attitude; and (d) a mechanism propelling the aircraft;

wherein the wings and fuselage produce lift in varying proportions depending upon the flight conditions as follows:

(i) the aircraft has a cruise design point in which the fuselage lift coefficient ($C_{LF}$) is 0.08 or less, and (ii) the fuselage lift coefficient is at least 0.50 at an angle of attack ($\alpha_{LZo}$) of 10°, in level flight at sea level (ISA) with all moveable lift enhancing devices retracted.

Another object of the invention is to provide an aircraft in which the fuselage lift coefficient is 0.03 or less at an altitude between 25,000 and 51,000 ft. ISA in level flight at a speed of 0.5 to 0.95 IMN, while at minimum calibrated airspeed in level flight at sea level ISA, the fuselage lift coefficient ($C_{LF}$) is at least 0.60, preferably 0.70 to 4.0.

DESCRIPTION OF THE PREFERRED EMBODIMENTS

Figure 1:
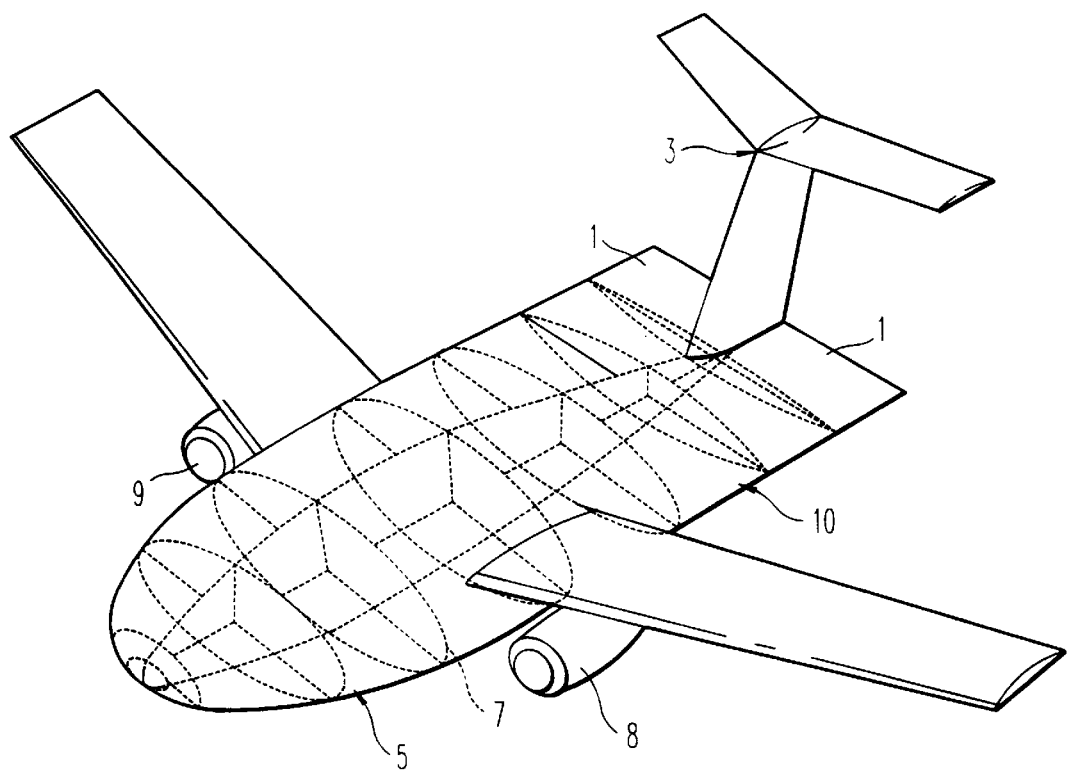
FIG. 1 is a perspective view of one embodiment of the invention.

The high induced drag that comes with lift from low aspect ratio wings is a very real problem, but it is possible for a lifting-fuselage/wing aircraft to avoid the problem at one design point (e.g. at high speed cruise or at maximum range cruise) if the fuselage is designed to fly at a small angle of attack ($\alpha_{ZLo}$) at that point in the envelope of possible flight conditions. Surprisingly, a lifting-fuselage/wing aircraft need not actually produce "α-lift" with its fuselage at all times, and at those times the high induced drag of this configuration disappears. However, α-lift is available from the fuselage in other phases of flight, such as take-off and landing. The term α-lift is defined herein as that lift produced by the body due to its angle of attack ($\alpha_{ZLo}$) relative to the airspeed vector $v_{co}$ shown in FIG. 4.

The concept of a "design point" is well known in the art. For many aircraft, considerable flying time is spent near a certain combination of standard atmospheric altitude and Mach number, and there is a desire to ensure especially efficient operation at this point in the envelope of possible flight conditions. In the present invention, the high aspect ratio wing is designed to provide adequate lift to support the airplane during cruise flight at a given Mach number and standard altitude—hereinafter the "design cruise condition," which condition may vary somewhat with weight as fuel is burned. Thus, no α-lift is required from the fuselage during cruise flight and the body can be designed to fly at a small angle of attack ($\alpha_{ZLo}$). The early lifting-fuselage/wing airplanes were designed to provide α-lift to the body at all times, especially during cruise flight, hoping to make them more efficient. The idea was to have the fuselage do two jobs at once—house the payload and lift it. This approach suggested that the wing should be mounted on the fuselage with a relatively small angle of incidence, to keep the body at a relatively large, positive angle of attack throughout the flight. Such a configuration is essentially a flying wing with nose and tail extensions and a thick section down the middle of the airframe, i.e., the fuselage. However, since the fuselage's lift coefficient is too high during cruise flight, that arrangement is less efficient than a conventional tubular fuselage and high aspect ratio wing because of the induced drag problem mentioned above.

The present invention has a wing mounted on the fuselage at a relatively large angle of incidence, or alternatively, it has a relatively high-lift wing, so that there is no need to produce α-lift from the body while flying at the design cruise condition. This feature keeps the body at small angles of attack near cruise speeds, just as is usually done in conventional designs.

The most surprising property of the present invention is that even though the airplane has a lifting fuselage, the fuselage does not produce unusually large amounts of lift most of the time—so it does not contribute large amounts of the expected induced drag most of the time. But, α-lift is available from the fuselage at other times, such as landing, when the high drag of a lifting fuselage is acceptable and even desirable.

The preferred angle of attack for the fuselage at the design cruise condition is from −3° to +3° and preferably around zero depending on its profile. The required small angle of attack can be achieved by proper selection of the wing's size and angle of incidence on the fuselage. This arrangement of the incidence angle is similar to that of conventional aircraft; that is, tubular bodies are also usually designed to fly at small angle of attack since they are not intended to produce α-lift. However, this geometry is unusual in a lifting-fuselage/wing airplane since it means that the fuselage produces little or no lift due to its airfoil shape most of the flight. For that reason the configuration should not be viewed as a flying wing. On the other hand, the present fuselage does produce enormous amounts of lift at other times, e.g. at speeds significantly below the chosen cruise design point speed, so it should not be viewed simply as a wide body configuration either.

The high α-lift at lower speeds can best be obtained if the fuselage has sufficient surface area and is made wide enough to be an efficient lifting body at angles of attack above about 4°. This requirement calls for 1) a fuselage aspect ratio $(AR_f)=(b_f)^2/S_f$ of 0.33 to 1.10, and 2) a surface area $(S_f)$ at least equal to the wing area $(S_w)$, each quantity determined with all landing gear, flaps and the like retracted. The $AR_f$ is preferably 0.38 to 0.75 and $S_f/S_w$ ranges from 1.0 to 4.0, preferably 1.2 to 1.8. It is possible to design the fuselage so that the total lift vector (L) continues to rise with increasing angle of attack even after the wing has stalled, although the lift curve is not linear after the stall is reached. As mentioned above, if the fuselage or wing has a high-lift device, such as a flap, which increases the total surface area upon deployment, the increased area is not included in $S_f$ and $S_w$ when calculating $AR_f$ or the ratio of $S_f$ to $S_w$.

Figure 3A:
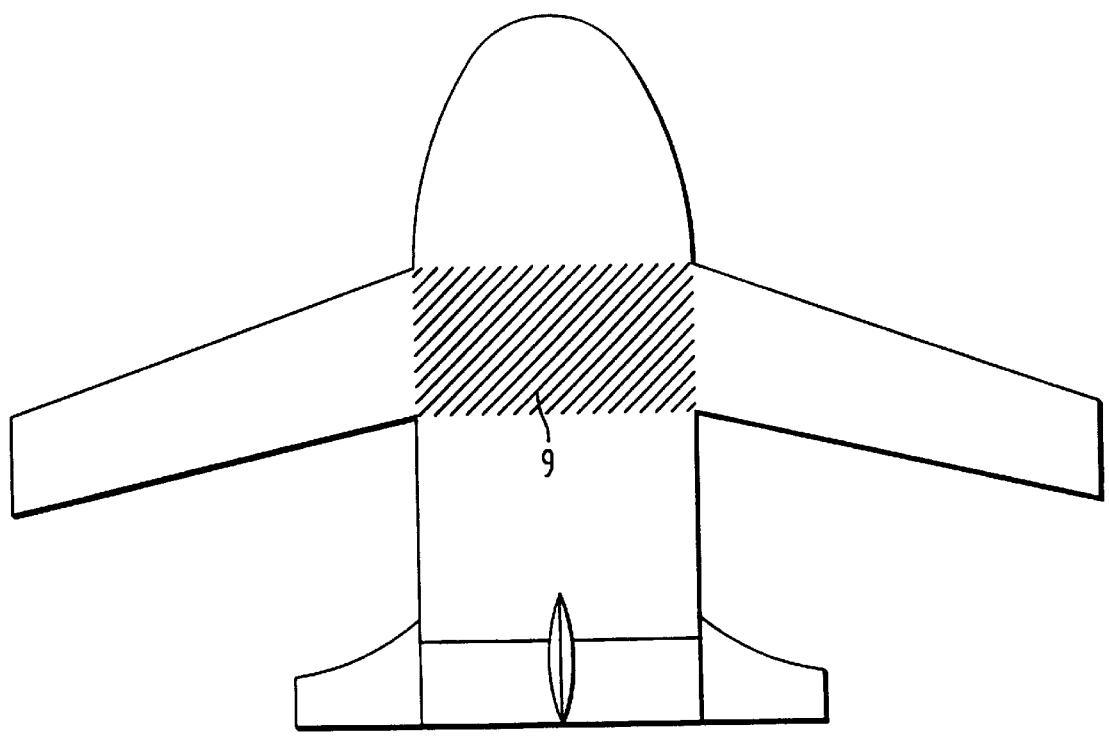
FIG. 3A shows the fuselage area between the wing roots included in wing area (a), for calculating aspect ratio ($AR_w$) of swept wings.
Figure 3B:
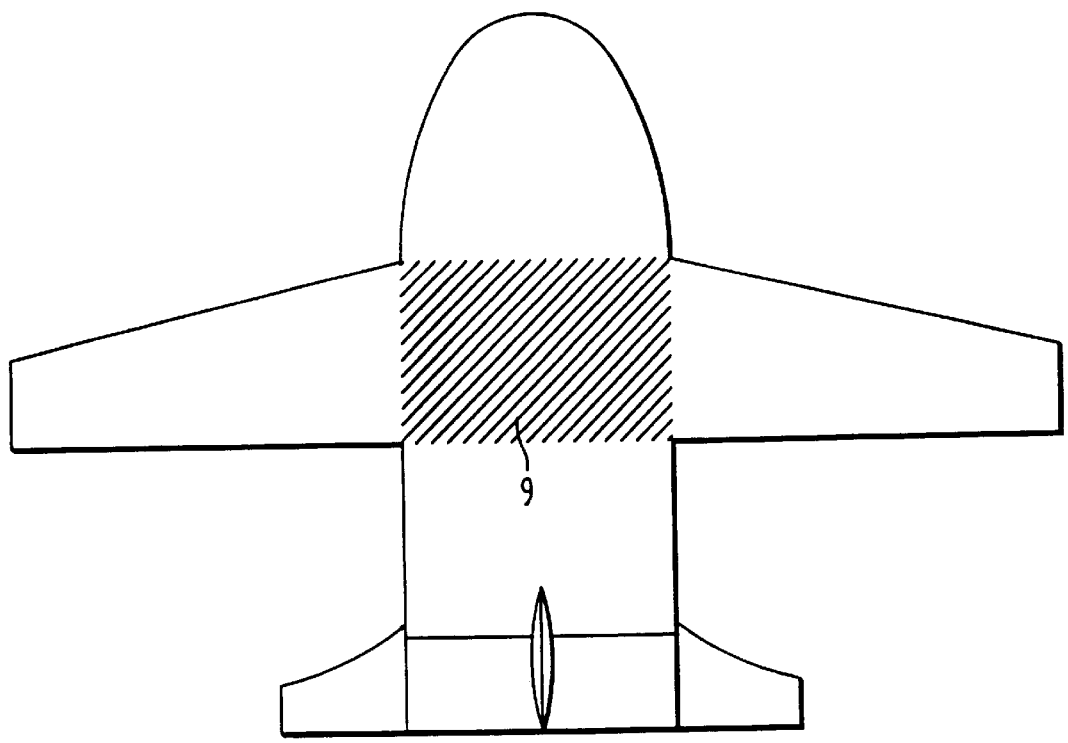
FIG. 3B shows the fuselage area between the wing roots included in wing area (a), for calculating aspect ratio ($AR_w$) of tapered wings.

The wing area $(S_w)$ must be distinguished from the wing area (a) that is used to calculate wing aspect ratio $(AR_w)$. The quantity $(S_w)$ does not include any of the fuselage area 9 between the wings, whereas the quantity (a) includes the fuselage area 9 between the wing roots as shown in FIGS. 3A and 3B.

Important benefits of the present aircraft include a much wider and more comfortable cabin than airplanes having tubular fuselages of the same volume. Another advantage is that at low speeds (high angles of attack), the fuselage produces positive α-lift, thereby lowering the landing speed. This extra lift can be so great that it obviates the need for wing flaps—reducing aircraft complexity without sacrificing low landing speed. Due to the roominess of the wide body, all fuel can be easily stored in the fuselage rather than in the wings, which also reduces aircraft complexity, and allows the designer or operator to easily trade payload for range without making large structural changes. Also, total drag can be lower than in some conventional designs in which the lower rear fuselage rises sharply to keep the tail from hitting the ground. That feature adds drag which the present configuration avoids. In a related benefit, the landing gear can be shorter and lighter. The greater width of the present fuselage relative to a tubular fuselage of equal volume causes the total wing span (b) to be longer without any need to increase the strength (and weight) of the wing itself. This extra span decreases the wing's induced drag at cruise without the usual weight penalty associated with increasing wing span. A maximum L/D of 12–16 for the complete aircraft is readily obtainable and with careful design a maximum L/D of 17–24 or more can be realized.

While in flight at a given combination of speed, altitude and angle of attack, the wings and fuselage have pressure distributions which can be estimated using known methods of fluid dynamics, such as three-dimensional panel codes capable of estimating attached-flow lift and induced drag, or measured experimentally with pressure sensors. Each pressure distribution can be summed or integrated to determine each surface's contribution to the total lift, positive or negative (up or down, respectively) and the fuselage's lift coefficient $(C_{LF})$ can be determined to a high degree of accuracy (±0.01), particularly at cruise speeds. A public-domain computer program which can be used is PMARC (Panel Method Ames Research Center) developed by NASA and described in the book "Low Speed Aerodynamics: From Wing Theory to Panel Method," Katz J. and Plotkin A., McGraw Hill (1992), as are other suitable methods.

Figure 4:
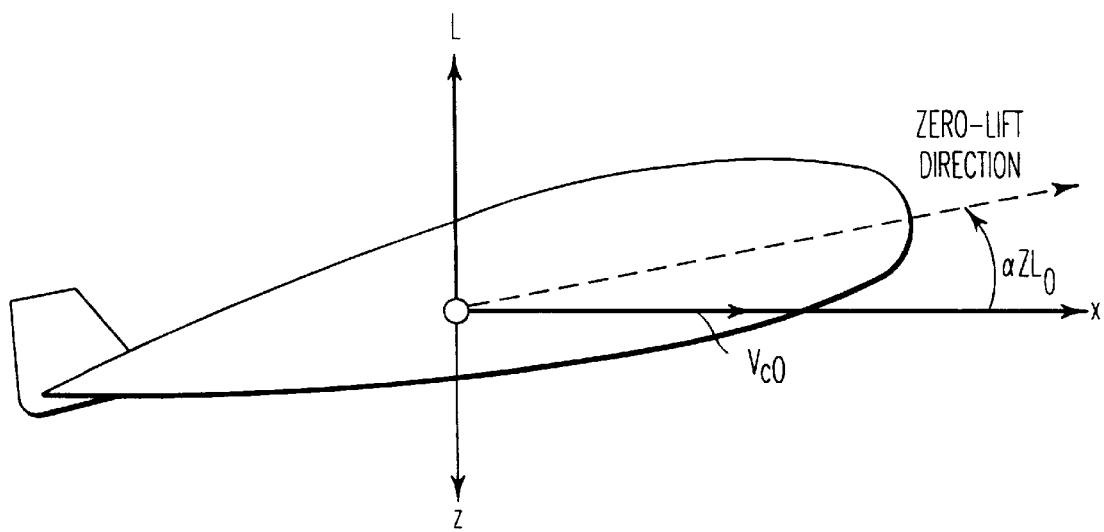
FIG. 4 shows the definition of angle of attack adopted herein.

Since there are many definitions of angle of attack, the one adopted here is shown in FIG. 4, which illustrates the profile of a fuselage in a flight condition that produces: (1) fuselage α-lift due to a large positive angle of attack, (2) carryover lift across the body, and possibly (3) lift by the power plant(s). Airspeed vector $v_{co}$, with subscript zero denoting that this is rectilinear, equilibrium motion, is shown aligned with the x-direction (flight direction) of stability axes. The total lift vector (L) is shown acting at the center of pressure of the aircraft. The dashed line is the "zero lift direction," which lies in the vertical plane of symmetry (if there is one, or the middle of the wing span if not) and has a fixed orientation relative to a vehicle of a given shape in a given range of flight Mach number, M. This line is defined by the property that, when $v_{co}$ is parallel to it, L vanishes. Thus, the angle of attack ($\alpha_{ZLo}$) is the instantaneous angle between $v_{co}$ and the zero lift line of the aircraft.

The wing and fuselage produce lift in relative amounts which vary according to the flight condition. For instance, if the fuselage's side profile is substantially symmetrical and designed to fly at small angles of attack near high speed cruise, low pressure on both upper and lower surfaces will cancel each other and produce little, if any, $\alpha$-lift in that flight condition. There may be a down force at the rear of the body for trim and stability purposes. Accordingly, the wings necessarily produce most of the positive lift required by the airplane at high speed cruise, the major exception being carryover lift across the body. High speed cruise and long range cruise are the preferred design points of the invention, although other design points are possible, such as maximum level flight speed.

The phenomenon of "carryover lift" is well known in the art although its source is not always entirely clear. Its major source is the low pressure area above the wing which, in turn, creates a low pressure area on the fuselage in the vicinity of the wing roots, hence some lift across the fuselage. Carryover lift occurs on tubular fuselages and airfoil-shaped fuselages alike. A certain amount of lift across any fuselage is desirable because induced drag from the wing is lower if the spanwise load distribution is continuous. The presence of some lift across an airplane's body reduces the effect of having a pronounced break in the spanwise loading, which would otherwise cause the wing panels to behave as if they were two separate wings, each of lower aspect ratio. For this reason the lift coefficient of the fuselage is small at the chosen cruise design point, but not zero, unless positive lift from the fuselage happens to be exactly cancelled by a down force produced at the rear for trim or stability purposes.

Carryover lift can be distinguished from $\alpha$-lift when the fuselage is flying at a substantial angle of attack ($\alpha_{ZLo}$). As $\alpha_{ZLo}$ decreases from large positive values, fuselage $\alpha$-lift goes to zero first and is designed to occur near the chosen cruise design point where the angle of attack is small. The remaining positive lift on the fuselage is concentrated between the wing roots, and is mainly due to carryover lift. There may also be a small contribution of lift due to camber in the fuselage's airfoil or a slight asymmetry between the top and bottom of the fuselage. The remaining lift then goes to zero approximately when airspeed vector ($v_{co}$) is parallel to the zero-lift direction (FIG. 4). It is possible for the fuselage to add some negative $\alpha$-lift while the wing adds some positive lift at the pitch angle in which $v_{co}$ is parallel to the zero-lift direction. This arrangement increases drag, which is useful for high speed descents without the need to deploy spoilers as speed brakes.

The wing can be placed high, low or mid-range on the fuselage. High-wing and mid-wing configurations provide the smoothest carryover of lift across the fuselage.

Angle of incidence is defined herein as the angle between the chord line of the wing (the straight line connecting the leading and trailing edges) at its root (where the wing joins the fuselage) and the chord line of the fuselage in the airplane's vertical plane of symmetry (if there is one, or the middle of the wing span if not). If there is a fairing over the wing/fuselage junction or transitional region distorting the chord line of the wing near the root, then the chord line at a position midway between wingtip and center of the body is used to determine wing incidence angle. The wing's preferred angle of incidence depends on its size, airfoil section, sweep, aspect ratio, and the chosen combination of standard altitude and flight Mach number defining the cruise condition at which the fuselage should generate little or no $\alpha$-lift. Selecting these variables is within the skill of modern aircraft designers. In general, when using traditional airfoil shapes, such as described by Abbott and Doenhoff in their book, "Theory of Wing Sections," (Dover Publications, 1959) the wing's angle of incidence should be between 2 and 10 degrees, preferably about 3–5 degrees.

The design point where fuselage $\alpha$-lift should be minimized corresponds to a cruise design point. For aircraft intended to cruise above 25,000 feet ISA the chosen speed is generally between 0.3 and 0.95 IMN, preferably 0.4 to 0.90 IMN and most preferably 0.6 to 0.85 IMN; these latter airplanes are typically jets. For aircraft intended to cruise between 8,000 and 25,000 feet ISA, the chosen speed is generally between 100 and 250 knots calibrated airspeed, preferably 150 to 200 KCAS; these airplanes are typically propeller driven. In one embodiment of this invention, the high speed cruise condition is at an indicated Mach number above 0.7 and a standard altitude (ISA) above 8,000 feet, at which condition the fuselage produces less total lift than at any lower indicated Mach number in level flight at the same standard altitude. In another embodiment the long range cruise condition occurs at 0.4–0.7 IMN and a standard altitude above 8,000 feet, at which condition the fuselage produces less total lift than at any lower indicated Mach number in level flight at the same standard altitude (ISA).

At low speeds, such as during landings, take-offs and climb maneuvers, the wing's angle of attack is relatively high (e.g., 12 degrees) so the fuselage will also fly at a substantial angle of attack, which can be estimated by subtracting the angle of incidence from the wing's angle of attack. At these times the fuselage produces positive $\alpha$-lift because it is flying at a large, positive angle of attack ($\alpha_{ZLo}$). This $\alpha$-lift is related to a large lift coefficient and accompanied by induced drag, but since that is only temporary it is acceptable. If the airplane is equipped with wing flaps, their deployment has the effect of increasing the wing's angle of attack, so it is possible to climb or descend having the fuselage at a somewhat smaller angle of attack, if desired, by deploying wing flaps.

The fuselage of the present invention can be used to produce $\alpha$-lift during take-off, climb, landing, straight and level flight at some speeds, and turning flight at some speeds. In order for the fuselage to produce substantial amounts of $\alpha$-lift at large angle of attack ($\alpha_{ZLo}$), it must have a large enough surface area, aspect ratio and lift coefficient ($C_{LF}$). Fuselage length is equal to the chord of the corresponding airfoil section, and fuselage maximum width is defined herein as the fuselage span ($b_f$). The required fuselage planform area ($S_f$) can be estimated by computing the pressure distribution at any desired flight condition using methods of fluid dynamics described by Katz and Plotkin cited above. The range of $S_f$ is generally 100 to 400% of the wing area ($S_w$), 120 to 180% being preferred for high flying jets.

Figure 2:
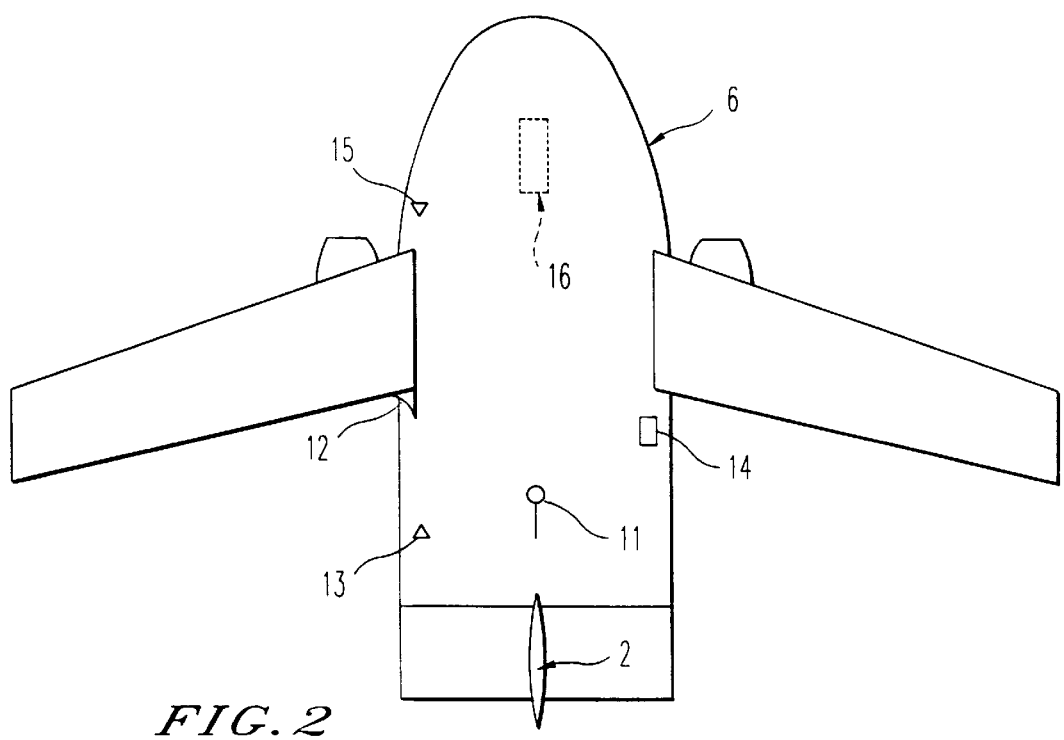
FIG. 2 is a planform view of another embodiment of the invention.

The fuselage aspect ratio ($AR_f$) is defined herein as $b_f^2/S_f$ where $b_f$ is the maximum fuselage span and $S_f$ is the planform area of the fuselage. If a fairing covers a junction between wing root and fuselage, its planform area outboard of the root is considered part of the wing and that inboard of the root is considered part of the fuselage, for calculating $S_w$ and $S_f$. The aspect ratio of the fuselage ranges from 0.33 to 1.10, preferably 0.35 to 0.75. Below 0.33 the $\alpha$-lift from the fuselage is insufficient to provide a lift coefficient ($C_{LF}$) of at least 0.50 at $\alpha_{ZLo}=10°$. Above $AR_f=1.10$ the aircraft has the problem of very limited CG range, as in a flying wing. The aspect ratio of the fuselage shown in FIG. 2 is about 0.4; its maximum length is 11.2 meters and maximum width is 4.4 meters. The aircraft of FIG. 2 generates from 35% to about 50% of the total lift from the fuselage at typical landing speeds, depending upon weight and speed. It is sometimes useful to have strakes or fences on the sides of the fuselage ahead of the wings in order to control vortices generated by the fuselage at high angles of attack. Inboard wing regions can also project forward like strakes, as seen on the Beechcraft Starship and the Tupolev Tu-244 which is a proposed supersonic transport. Such strakes, fences and inboard wing regions are considered part of the wing area for calculating (a) and ($S_w$).

Wing aspect ratio ($AR_w$) is defined by the formula $AR_w = b^2/a$, wherein (b) is wing span, and (a) is wing planform area which includes the planform area of the fuselage between the wing roots, as illustrated in FIGS. 3A and 3B. These definitions mean that (a) and ($S_f$) overlap but ($S_w$) and ($S_f$) do not. In FIG. 2 the wing aspect ratio is about 8.1.

The mechanism for controlling aircraft attitude is (1) a pitch control surface that constitutes the rear of the fuselage airfoil 1, plus a yaw control surface 2 on the fuselage with optional rudder(s), or (2) a discrete tail attached to the body, such as the well-known "T-tail" 3 or a horizontal surface spanning two vertical fins at the rear of the fuselage. A discrete tail of type (2) is not included in area $S_f$. However, if the pitch control surface is of type (1), i.e., part of the fuselage's airfoil profile, then its area is included in $S_f$ except for any part that extends laterally beyond the sides of the adjacent fuselage. Rearwardly located pitch control surfaces usually provide a down force, i.e., negative lift, and thus reduce the overall lift coefficient of the fuselage ($C_{LF}$). Any down force produced by a T-tail also reduces the calculated amount of fuselage lift and the corresponding lift coefficient, $C_{LF}$.

Another mechanism for controlling the aircraft's attitude is to have rearwardly placed fins angled about 20°–75° from the horizontal, thus supplying pitch, yaw and roll control simultaneously. Another option is a forwardly positioned pitch control surface extending out on either side of the fuselage ahead of the wings, often termed a canard. If any of the attitude control devices 4 on the fuselage extend laterally beyond the adjacent fuselage sides, such extensions are not considered part of the span ($b_f$) or area ($S_f$) but their negative and positive lift contributions are attributed to the fuselage lift value. Attitude control can also be achieved with a movable nozzle on a jet engine which vectors thrust.

The sides of the present lifting-fuselage 5 and 10 are not flat, except possibly in small regions amounting to less than 5% of ($S_f$), preferably less than 2%. The cross-sections in planes normal to the flight direction have rounded corners and rounded sides. The "sides" are defined herein as that part of ($S_f$) which lies outboard of the middle 60% of ($b_f$). The preferred cross-section is oval or elliptical except where modified by the wings, control devices, propulsive devices, antennae, fairings, vents, intakes, fittings, landing gear, etc.

The fuselage planform can be rectangular or swept back in straight lines from the middle of the leading edge at from 1° to 35°, but the preferred planform has a leading edge that is rounded. That is because circular, elliptic and parabolic leading edge planforms give lower skin friction drag. A potential problem with any fuselage having non-circular cross-sections in planes normal to the flight direction is that the pressure changes at different rates across the span as the flow advances along the body. These pressure gradients cause spanwise flows to develop, and can trip a laminar boundary layer to a turbulent one prematurely, increasing the skin friction drag. This problem can be quite severe for lifting bodies at high speeds even if the angle of attack is small because the pressure can drop rapidly on the upper and lower skins of the forebody, due to the high curvature, while the sides remain near ambient pressure. This pressure difference causes air to flow around the body from the sides to the top and bottom. Such spanwise flows intensify as the flight speed increases. However, if the fuselage has an elliptic or substantially elliptic cross-section in planes normal to the flight direction 7 and an elliptic or substantially elliptic planform leading edge 6, as shown in FIG. 2, it maintains a more uniform pressure change around the entire body as the flow advances, thus minimizing spanwise flow and maintaining liminar flow to around 30–50% of body length, depending on where the maximum thickness occurs. The forebody is defined herein as that portion of fuselage ahead of the wings including any strakes or fairings.

In FIG. 2 the leading edge of the body is defined by an ellipse in which the short axis equals the fuselage span ($b_f$=4.4 m) and the long axis is 7.8 m and lies in the aircraft's vertical plane of symmetry (i.e. the flight direction). In general, the leading edge ellipse is defined by an aspect ratio, (large axis/small axis) of from 1 to 3, the range 1.5 to 2.2 being preferred. Either axis of the ellipse can lie in the flight direction. Having an elliptical forebody is most important for airplanes intended to cruise at speeds above 175 KCAS and particularly for speeds above 220 KCAS. The minimum total aircraft drag coefficient ($C_D$) can be 0.04 to 0.03 or even as low as 0.02 or 0.01 for airplanes of high $AR_w$. The value of ($C_D$) is determined using the wing area quantity (a), defined above, as the reference area, with all high lift devices (and landing gear, etc.) retracted, the attitude control surfaces at their lowest drag configuration and with zero thrust (±1%) from the power plants.

The fuselage's contribution to the total lift can vary from negative values at substantial, negative angles of attack, to about 100% at large positive angles of attack where the wing has fully stalled. Most airfoil sections stall at angles of attack about 16°, although an actual wing having the same profile may stall at a slightly different value (often about 18°) due to its geometry and interaction with the fuselage. If the angle of incidence is set at 6° the wing may be partially or fully stalled when the fuselage is pitched up to $\alpha_{ZLo}$=12°, and the fuselage may be generating 50%–100% of the lift, while its lift coefficient, $C_{LF}$, is at least 0.6 and preferably 0.80 to 1.8, measured with high-lift devices retracted.

Furthermore, because lifting bodies have shallow lift curves, i.e., the graph of lift versus angle of attack has a smaller slope than high AR wings—and also possibly because of vortex lift from the body, which starts at about $\alpha_{ZLo}$=8°—the present fuselage does not stall until reaching extremely high angles of attack. This phenomenon provides the ability to fly at very low airspeeds if the fuselage lift coefficient ($C_{LF}$) is large enough. Therefore, the ratio of maximum speed to minimum speed can be quite high, particularly for an aircraft without trailing edge wing flaps.

It is sometimes desirable to operate an airplane with the wings partially or fully stalled, such as just prior to landing. The present lifting-fuselage/wing airplanes can also permit other stalled-wing operations, such as aerobatic maneuvers, military fighter maneuvers and crop duster maneuvers involving small radius turns or high g-forces (greater than 4.4 g), relieving stress on the wings by stalling and using lift from the body to perform the maneuver. If the airplane is designed to operate with the wings intentionally stalled, it is preferable to have an attitude control device on the body which has differential movement 1, such as elevons used on delta wing airplanes, to control pitch and roll. Due to the greater width of the present fuselage relative to conventional tubular bodies, it is possible to control attitude throughout the flight envelope using only attitude control devices located on the fuselage or tail. If desired, the present aircraft can be built without ailerons or spoilers on the wings for roll control. Alternatively, the ailerons or spoilers can occupy an inboard position on the wings, i.e., in the usual location of wing flaps, although outboard positions generally make the wing more efficient.

Since all the fuel can be easily stored in the fuselage, the wing can be optimized for lower drag than in conventional airplanes, where the wing is usually made thicker or larger than optimal to accommodate large fuel tanks. The wide body of this invention can accommodate much larger radar antennas than tubular bodies of equal volume which is a tremendous advantage for the small and mid-size airplanes, i.e., those less than 25,000 pounds gross weight, particularly those less than 16,000 pounds.

The wing profile or "section" can be selected from any of the useful airfoil shapes, including high-lift sections and transonic sections designed to minimize drag near the speed of sound. It is generally necessary to sweep the wing 10° to 70° to lower the critical Mach number if the aircraft is designed to operate in the transonic or supersonic regions, preferably 13° to 38°. The wing may have high lift devices such as trailing-edge flaps, and leading edge flaps, slots or moveable slats. Wings having no such device or only a leading-edge device are preferred.

The camber line is the mean line of the airfoil. The mean line is considered to be the locus of points situated halfway between the upper and lower surfaces of the section, these distances being measured normal to the mean line. If the mean line is straight, the airfoil is symmetrical; otherwise it is cambered.

In order to cruise efficiently, the wing's aspect ratio should be at least 5 and is generally 6 to 50, preferably 7 to 20 depending upon the aircraft's mission. Passenger jets are usually optimized to cruise between 30,000 and 51,000 feet and have wing aspect ratios of about 8 to 15.

The fuselage profile may be selected from among any of the useful airfoil sections mentioned in connection with the wings. In general, airfoils having a maximum thickness of 8–40% of the cord length are suitable. A thicker profile gives greater maximum cabin height for a given fuselage length but tends to reduce the lever arm of the pitch control means. A thickness of 8–30% is typical for high-speed applications. Transonic sections of 8–28% thickness are very useful in the transonic speed range. Symmetrical or nearly symmetrical 15–18% thick airfoil sections, modified near the wings to provide a smooth carryover of lift if necessary, are the preferred fuselage profiles for high subsonic speed airplanes. The fuselage in FIG. 1 has about 18% maximum thickness and employs symmetrical NACA airfoil $63_3$-018. The fuselage can have high-lift devices, such as trailing-edge flaps, and leading-edge flaps, slots or moveable slats. The aircraft may also incorporate a lift-rotor such as in a helicopter or auto-gyro (unpowered rotor). FIG. 2 depicts an antenna 11, a fairing 12, a vent 13, a fitting 14, an intake 15, landing gear 16, and a leading-edge flap or slat 17.

For trim and longitudinal stability, the aircraft's center of gravity must be located, roughly speaking, ahead of the aerodynamic center of its wing, fuselage and control surfaces taken together. This requirement can be relaxed by using active control surfaces guided by computer.

For good controllability and handling qualities perceived by pilots, the center of pressure of the lifting fuselage ideally should remain near the center of pressure of the wing at most useful angles of attack. Alternatively, the center of pressure of the fuselage should travel in the opposite direction from that of the wing, so that the moments caused by the two lifting forces counter-balance about the center of gravity as the pitch changes. These perceived qualities can be modified by computer control.

Calibrated airspeed is the aircraft's indicated airspeed corrected for position and instrument error. ISA stands for International Standard Atmosphere which has a sea level pressure of 29.92 inches of mercury, an altitude of zero feet and a temperature of 15° C. IMN stands for indicated Mach number.

Propulsion can be provided by any suitable power plant, such as one or more jet engines 9, turboprops or piston engines. The preferred locations for jet engines are in nacelles 8 attached either to the wing's lower surface, to the fuselage below and slightly in front of the wing's leading edge, to the upper rear surface of the fuselage, to a vertical stabilizer, or to the sides of the fuselage near the rear. The preferred location for a propeller is ahead of the fuselage. Engine components and discrete engine nacelles are considered part of the wing surface area for calculation of (a) and ($S_w$), or part of the fuselage area ($S_f$), depending on where the nacelle is attached. If an engine is located within the fuselage, then the air inlet region or cowling is considered part of the fuselage area for calculating $S_f$. Parts of a cowling on a wing-mounted engine which extend beyond the leading or trailing edge of the wing are considered part of the wing planform area for calculating $S_w$ and (a).

Lift coefficients are calculated using a general formula of the form $L = C_L \cdot \rho/2 \cdot S \cdot (V)^2$ where L=lift $\rho$=mass density of air S=reference area V=speed $C_L$=lift coefficient The fuselage lift coefficient ($C_{LF}$) of this invention is calculated by measuring total fuselage lift (with flaps and the like retracted and attributing carryover lift to the fuselage) at a given calibrated airspeed and standard altitude, and applying the general formula using ($S_f$) as the reference area. The wing lift coefficient ($C_{LW}$) of this invention is calculated by measuring total wing lift (again with flaps not deployed and attributing carryover lift to the fuselage only), and applying the general formula using ($S_w$) as the reference area. The quantity ($C_{LW}$) is therefore different from the more common definition of lift coefficient which is based upon a wing reference area including part of the fuselage between the wings.

At the design cruise condition, $C_{LW}/C_{LF}$ is greater than 4 and generally between 8 and 1000, preferably 10 to 100. At minimum calibrated airspeed in level flight at sea level ISA, $C_{LW}/C_{LF}$ is generally 0 to 4.0, preferably 0.5 to 3.0.

Obviously, variations of the present invention are possible in light of the above teachings. Therefore, within the scope of the appended claims, the invention may be practiced otherwise than as specifically described herein.

I claim:

1. An aircraft comprising:
   (a) a lifting fuselage having a cross-section constituting an airfoil in a majority of vertical planes taken parallel to the flight direction and an aspect ratio ($AR_f$) of 0.33 to 1.10;

(b) wings fixed to the fuselage having an aspect ratio ($AR_w$) of at least 5.0;

(c) a mechanism controlling aircraft attitude; and (d) a mechanism propelling the aircraft;

wherein the wings and fuselage produce lift in varying proportions depending upon flight conditions as follows:

(i) the aircraft has a cruise design point in which the fuselage lift coefficient ($C_{LF}$) is 0.08 or less, and (ii) the fuselage lift coefficient is at least 0.50 at an angle of attack ($\alpha_{LZo}$) of 10°, in level flight at sea level (ISA) with all movable lift enhancing devices retracted; and wherein the aircraft has a maximum L/D value of 16 or more.

2. The aircraft of claim 1 wherein the fuselage 1) has a cross-section that is rounded, in a majority of planes taken normal to the flight direction, 2) has a rounded planform leading edge, 3) has an aspect ratio ($AR_f$) of 0.35 to 0.41, and 4) ($C_{LF}$) is at least 0.60 at $\alpha_{LZo}=10°$.

3. The aircraft of claim 1, wherein the fuselage 1) has a cross-section that is rounded, in a majority of planes taken normal to the flight direction, 2) has a rounded planform leading edge, 3) has an aspect ratio $AR_f$ of 0.39 to 0.50 and 4) ($C_{LF}$) is at least 0.615 at $\alpha_{ZLo}=10°$.

4. The aircraft of claim 1, wherein the fuselage 1) has a cross-section that is rounded, in a majority of planes taken normal to the flight direction, 2) has a rounded planform leading edge, 3) has an aspect ratio ($AR_f$) of 0.37 to 1.10, and 4) said cruise design point is a flight condition in which ($C_{LF}$) is 0.03 or less.

5. The aircraft of claim 1 wherein the wing aspect ratio is 7–20.

6. The aircraft of claim 1 wherein the fuselage lift coefficient ($C_{LF}$) is at least 0.60 in level flight at sea level (ISA).

7. The aircraft of claim 1 wherein the fuselage lift coefficient ($C_{LF}$) is at least 0.70 in level flight at sea level (ISA).

8. The aircraft of claim 1 wherein said fuselage has a cross-section which comprises a symmetrical airfoil except where optionally modified by the wings, attitude control mechanisms, propulsive mechanisms, antennae, fairings, vents, fittings, intakes or landing gear.

9. The aircraft of claim 1 wherein said fuselage has a cross-section which comprises a cambered airfoil, optionally modified by the wings, attitude control mechanisms, propulsive mechanisms, antennae, fairings, vents, intakes, fittings or landing gear.

10. The aircraft of claim 1 wherein (1) said cruise design point is one of a high speed cruise condition and a long range cruise condition, which is between 8,000 and 25,000 feet ISA and between 100 and 250 knots calibrated airspeed, and (2) the fuselage produces less total lift at said cruise condition than at any lower calibrated airspeed in level flight at the same standard altitude.

11. The aircraft of claim 1 wherein (1) said cruise design point is one of a high speed cruise condition and a long range cruise condition, which is between 25,000 and 51,000 feet ISA and between 0.3 and 0.85 IMN, and (2) the fuselage produces less total lift at said cruise condition than at any lower indicated Mach number in level flight at the same standard altitude.

12. The aircraft of claim 1 wherein the wings are without a trailing-edge flap that moves relative to the airframe to reduce stall speed.

13. The aircraft of claim 1 wherein the wings have one of a leading-edge flap and a slat, and are without a trailing-edge high lift device that moves relative to the airframe to reduce stall speed.

14. The aircraft of claim 1 wherein the wings are without surfaces that move relative to the airframe and are deployed for roll control.

15. The aircraft of claim 1 wherein the wings are without a fuel storage tank.

16. The aircraft of claim 1, wherein the aircraft is without a lifting-rotor.

17. The aircraft of claim 1 wherein the fuselage produces substantially no positive $\alpha$-lift in level flight at an altitude between 8,000 and 25,000 ft. ISA at a power setting between 55% and 85% of maximum continuous power.

18. The aircraft of claim 1 wherein the fuselage produces substantially no positive $\alpha$-lift in level flight at an altitude between 25,000 and 51,000 ft. ISA at a speed between 0.5 and 0.95 IMN.

19. The aircraft of claim 1 wherein at minimum calibrated airspeed in level flight at sea level ISA, the fuselage lift coefficient ($C_{LF}$) is at least 0.8.

20. The aircraft of claim 1 wherein said cruise design point is a flight condition in which $C_{LM}/C_{LF} \geq 10$.

21. The aircraft of claim 1 wherein said cruise design point is a flight condition in which ($C_{LF}$) is 0.02 or less.

22. The aircraft of claim 1 wherein the fuselage produces at least 40% of the total lift at minimum calibrated airspeed in level flight at sea level ISA.

23. The aircraft of claim 1 wherein the fuselage produces at least 45% of the total lift at minimum calibrated airspeed in level flight at sea level ISA.

24. The aircraft of claim 1 wherein the fuselage produces at least 50% of the total lift in level turning flight.

25. The aircraft of claim 1 wherein the fuselage produces at least 50% of the total lift shortly before landing.

26. The aircraft of claim 1 wherein said pitch control means is a horizontal control surface that is part of said fuselage cross-section recited in part (a).

27. The aircraft of claim 1 wherein the fuselage surface area ($S_f$) is 120% to 180% of the wing surface area ($S_w$).

28. A process of using the aircraft claimed in claim 1 selected from the group consisting of applying chemicals to crops, and performing maneuvers involving acceleration forces above 4.4 times the force of gravity.

* * * * *